United States Patent
Xiong et al.

(10) Patent No.: US 9,826,257 B2
(45) Date of Patent: Nov. 21, 2017

(54) CAPTION AND SPEECH ALIGNMENT FOR A VIDEO DELIVERY SYSTEM

(71) Applicant: HULU, LLC, Santa Monica, CA (US)

(72) Inventors: Tao Xiong, Beijing (CN); Zhibing Wang, Beijing (CN); Heng Su, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 14/798,065

(22) Filed: Jul. 13, 2015

(65) Prior Publication Data

US 2016/0014438 A1 Jan. 14, 2016

Related U.S. Application Data

(60) Provisional application No. 62/024,401, filed on Jul. 14, 2014.

(51) Int. Cl.
| | |
|---|---|
| *H04N 21/234* | (2011.01) |
| *H04N 21/233* | (2011.01) |
| *H04N 21/235* | (2011.01) |
| *H04N 21/242* | (2011.01) |
| *H04N 21/81* | (2011.01) |
| *H04N 21/488* | (2011.01) |
| *H04N 21/845* | (2011.01) |

(52) U.S. Cl.
CPC ..... *H04N 21/23424* (2013.01); *H04N 21/233* (2013.01); *H04N 21/2353* (2013.01); *H04N 21/242* (2013.01); *H04N 21/4884* (2013.01); *H04N 21/812* (2013.01); *H04N 21/8456* (2013.01)

(58) Field of Classification Search
CPC ........... H04N 21/23424; H04N 21/233; H04N 21/2353; H04N 21/242; H04N 21/812; H04N 21/4884; H04N 21/8456
See application file for complete search history.

(56) References Cited

U.S. PATENT DOCUMENTS

| | | | |
|---|---|---|---|
| 2007/0185704 A1* | 8/2007 | Yoshimura | G10L 17/26 704/10 |
| 2011/0134321 A1* | 6/2011 | Berry | G11B 27/10 348/464 |
| 2015/0003797 A1* | 1/2015 | Schmidt | G11B 27/10 386/201 |
| 2015/0271442 A1* | 9/2015 | Cronin | G10L 15/26 348/464 |

* cited by examiner

*Primary Examiner* — Benjamin R Bruckart
*Assistant Examiner* — Susan X Li
(74) *Attorney, Agent, or Firm* — Fountainhead Law Group P.C.

(57) ABSTRACT

In one embodiment, a method determines a video including ad slots inserted within the video. The method generates a caption curve for a caption file of caption segments for a video based on start and stop times for caption segments in the caption file. The caption segments in the caption file were generated for the video without including ad slots. Then, the method determines a speech velocity for the video using the caption file and revises the caption curve based on the speech velocity and a number of characters in caption segments in the caption file. A speech probability curve is determined based on audio of the video and the method correlates the speech probability curve to the revised caption curve to align the caption segments of the caption file with speech of the video.

19 Claims, 15 Drawing Sheets

US 9,826,257 B2

CAPTION AND SPEECH ALIGNMENT FOR A VIDEO DELIVERY SYSTEM

CROSS REFERENCE TO RELATED APPLICATIONS

The present disclosure claims priority to U.S. Provisional App. No. 62/024,401, entitled "Caption and Dialogue Alignment", filed Jul. 14, 2014, the contents of which is incorporated herein by reference in its entirety.

BACKGROUND

A video delivery service may delivery videos to users of the service. In one example, a video delivery service may offer a library of videos that the users can request on-demand. In some cases, the delivery of the videos may be supported by dynamically inserting advertisements (ads) into the videos while they are being delivered. The advertisements may be inserted in ad slots that are designated at certain times within the video.

The video delivery service may not be the original content owner for some of the videos that are delivered. In this case, the video delivery service may receive a video file of the video, which may be for a television show. The video file may include the entire content of the show in an uninterrupted fashion. That is, there are no ad slots inserted within the show in the video file. When the video delivery service inserts ad slots into the video, this may misalign the speech of the video with the captions for the video. For example, a company different from the content source or the video delivery service may provide a caption file for the video. The captions in the caption file may follow the speech of the video in its original format (e.g., without ad slots inserted). When the video delivery service inserts ad slots into the video, the captions may become misaligned. Typically, the video delivery service must manually align the captions with the speech of the video. This may be an inefficient process and also take a long time, especially when the video delivery service includes many videos in the library.

SUMMARY

In one embodiment, a method determines a video including ad slots inserted within the video. The method generates a caption curve for a caption file of caption segments for a video based on start and stop times for caption segments in the caption file. The caption segments in the caption file were generated for the video without including ad slots. Then, the method determines a speech velocity for the video using the caption file of the video and revises the caption curve based on the speech velocity and a number of characters in caption segments in the caption file. A speech probability curve is determined based on audio of the video and the method correlates the speech probability curve to the revised caption curve to align the caption segments of the caption file with speech of the video.

In one embodiment, as non-transitory computer-readable storage medium contains instructions, that when executed, control a computer system to be configured for: determining a video including ad slots inserted within the video; generating a caption curve for a caption file of caption segments for a video based on start and stop times for caption segments in the caption file, wherein the caption segments in the caption file were generated for the video without including ad slots; determining a speech velocity for the video using the caption file of the video; revising the caption curve based on the speech velocity and a number of characters in caption segments in the caption file; determining a speech probability curve based on audio of the video; and correlating the speech probability curve to the revised caption curve to align the caption segments of the caption file with speech of the video.

In one embodiment, an apparatus includes: one or more computer processors; and a non-transitory computer-readable storage medium comprising instructions, that when executed, control the one or more computer processors to be configured for: determining a video including ad slots inserted within the video; generating a caption curve for a caption file of caption segments for a video based on start and stop times for caption segments in the caption file, wherein the caption segments in the caption file were generated for the video without including ad slots; determining a speech velocity for the video using the caption file of the video; revising the caption curve based on the speech velocity and a number of characters in caption segments in the caption file; determining a speech probability curve based on audio of the video; and correlating the speech probability curve to the revised caption curve to align the caption segments of the caption file with speech of the video.

The following detailed description and accompanying drawings provide a better understanding of the nature and advantages of particular embodiments.

DETAILED DESCRIPTION

Described herein are techniques for a caption alignment system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments align captions with speech in a video. A caption may be a segment that may include a character line or multiple character lines (or any other information found in a caption). Both the captions and the video may be received from different sources. For example, a content source may generate a video file for a show, such as a television show. A caption file may be generated by another party that generates captions for videos. However, it will be understood that the same source may generate the video and the captions, and even the video delivery service may generate the video and the captions. The video delivery service often modifies the video to insert advertisement (ad) slots after the captions have been generated for the original video. The video content near the ad slot may also be changed to smooth the interruption by the insertion of advertisements (ads) in the ad slots. For example, a fade-in/out effect may be added to the video around the ad slots. Often, the length of the change due to inserting the ad slots is not recorded.

The caption file is generated with time stamps that indicate when to display the captions. Often, the time stamps are based on the original video file that is received from the content source. When the video delivery service alters the video to insert ad slots, the time stamps for the captions may become misaligned with the speech of the video.

Particular embodiments automatically analyze the caption file and an audio file for the video to align the captions. The caption file may be analyzed by determining a caption curve based on when the captions in the caption file indicate speech is occurring or not. However, the caption curve may not align the captions accurately as will be described below. Accordingly, particular embodiments revise the caption curve using a distribution of speech velocity such that the caption curve can be used to align the captions more accurately. Further, particular embodiments use the audio file to determine an audio probability curve that indicates the probability that speech is occurring throughout the video. Then, the audio and captions are aligned using an alignment method based on the revised caption curve and the audio probability curve. The use of the revised caption curve for the caption file may allow a more accurate alignment that can be performed in a faster manner.

Figure 1:
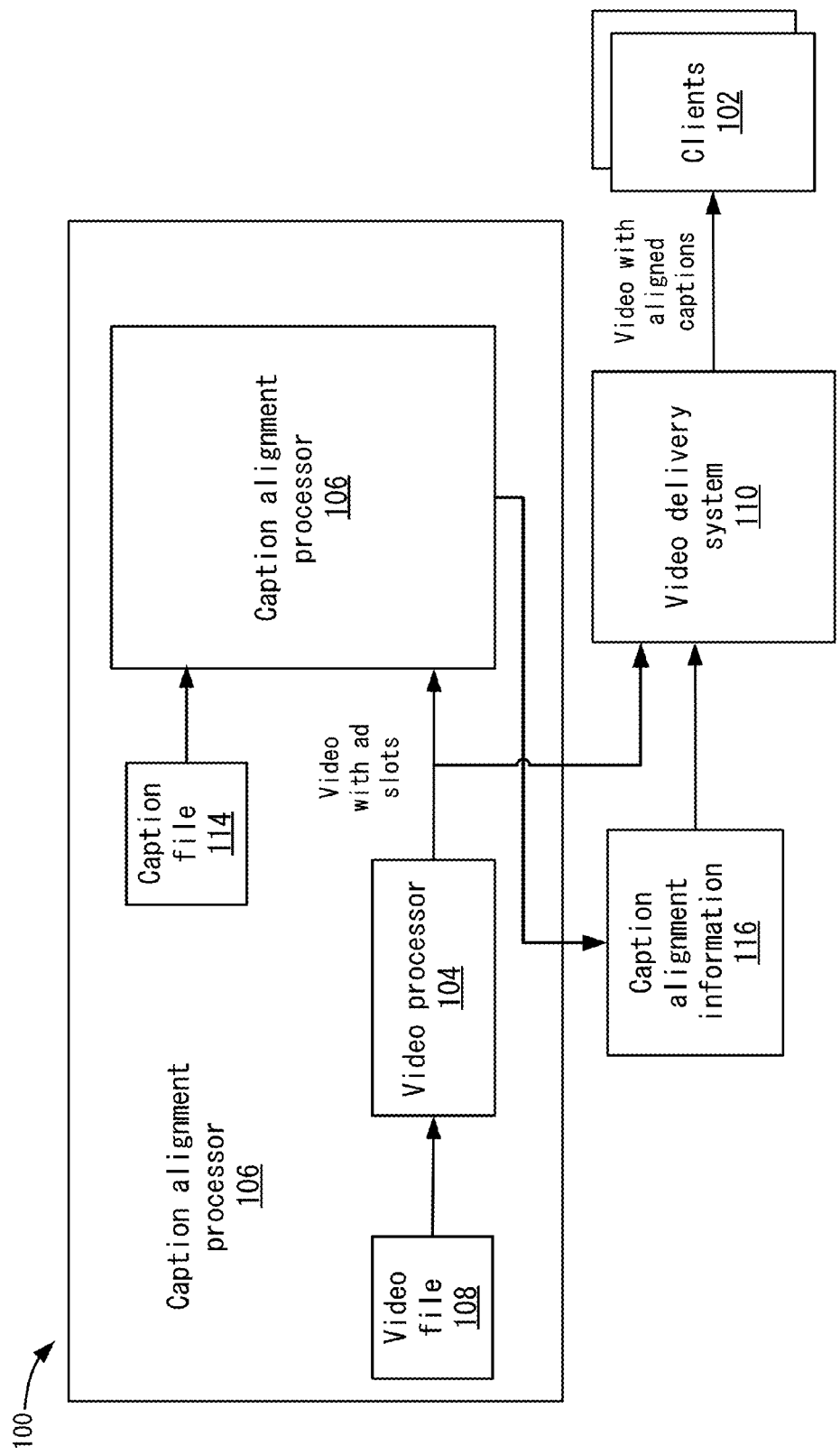
FIG. 1 depicts an example system for aligning captions and audio for a video according to one embodiment.

FIG. 1 depicts an example system for aligning captions and audio for a video according to one embodiment. A computer system 102 includes a video processor 104 and caption alignment processor 106. Video processor 104 may receive a video file 108 of a video. The video file may be from a content source different from a video delivery service. That is, a television show may be created by a content source and the video file 108 is received by the video delivery service and processed by video processor 104. In other embodiments, the video delivery service may also create its own content. In both cases, however, the video file does not include ad slots included within the video.

Video processor 104 may process video file 108 to insert ad slots into the video. Ad slots may be a break or slot that breaks up the content of the video. In other embodiments, ad slots may already have been inserted into video file 108 when the video delivery service receives video file 108; however, the ad slots were inserted after the captions were generated. The use of ad slots allows a video delivery system 110 to dynamically insert advertisements into the ad slots while the video is being sent to the user. Video delivery system 110 may determine which advertisements should be inserted into the ad slots at the time when the ad slot is encountered while delivering the video to client devices 102. By inserting ad slots into video file 108, the video delivery service can determine at a later time which advertisement can be inserted and also customize the advertisements to users. Thus, in this case, video file 108 may not have specific ads inserted. In some cases, blank space may be inserted in video file 108 in the ad slots. Video processor 104 outputs a video with ad slots inserted within the video. This may segment the video and also change the timing of the segments of video. For example, segments of video are interspersed with ad segments and this causes the length of the video to be longer.

A caption file 114 may include captions for the speech of the video. For example, the captions may be transcriptions of the actor's speech or any events that are occurring in the video. Typically, the captions are associated with time stamps that indicate when to display the captions while the video is being played. Typically, a third source that is different from the content source and the video delivery service may generate the caption files. In other embodiments, the content source or video delivery service may also generate the captions in caption file 114, but the captions that are generated are still aligned to the speech in the video that does not include ad slots. In some cases, an automatic speech recognition program is used to detect the captions.

A caption alignment processor 106 may receive the video with the ad slots and also caption file 114. Captions in caption file 114 may be misaligned with the speech of the video because of the ad slots that were inserted. Also, other inherent misalignments from caption file 114 may be present. For example, as will be described in more detail below, the captions may either begin before the speech occurs in a video segment or the speech may end at the end of the video segment, but the caption may still be displayed. These misalignments are inserted on purpose by the content source or the caption generator. In one embodiment, these misalignments may help a user follow the video, such as the user can start reading a long caption before the speech starts. However, these misalignments can affect the alignment process. Caption alignment processor 106 aligns the captions in caption file 114 with the speech of the video. The alignment will be described in more detail below, but involves pre-processing the caption file to create a caption curve of the captions that can be used to align the captions with a speech probability curve.

Once aligned, caption alignment processor 106 may output alignment information 116 based on the caption alignment. For example, offsets from the original time stamps may be used to align the captions to the speech of the video with the ad slots inserted. Also, new timestamps may be output based on the offsets. The video with the ad slots and also the alignment information 116 for the caption alignment may be stored.

Thereafter, video delivery system 110 may deliver the video with the ad slots and also the captions from caption file 110 to client devices 102. The captions are aligned with the speech of the video using the alignment information. It will be understood that various methods of delivering the video may be used, such as using a content delivery network (CDN) to deliver the videos with captions to client devices 102. As will be understood, video delivery system 110 may insert ads within the ad slots when the ad slots are encountered while playing the video.

Figure 2A:
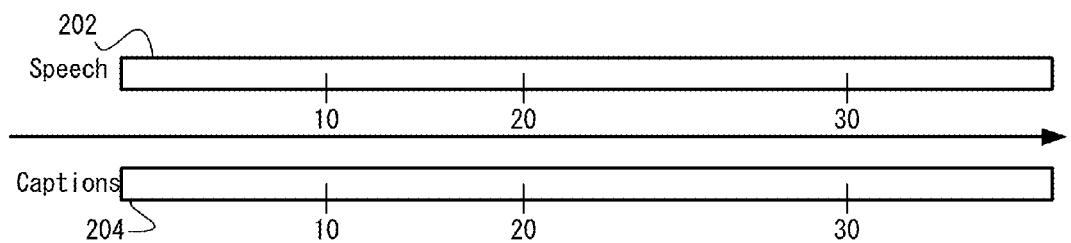
FIGS. 2A and 2B depict an example of misalignment of video segments and caption segments according to one embodiment.
Figure 2B:
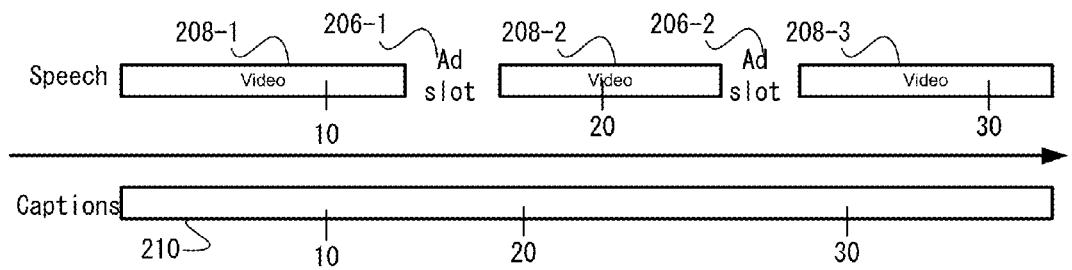

FIGS. 2A and 2B depict an example of misalignment of video segments and caption segments according to one embodiment. In FIG. 2A, at 202, the speech and/or video of the original video file 108 is shown. As seen, no ad slots are included in the video. At 204, the captions are shown. The captions are aligned with the speech of the video. The markers at 10, 20, and 30 minutes (or another time scale) are shown.

In FIG. 2B, ad slots have been inserted at 206-1 and 206-2. No specific advertisement content has been inserted here. Also, video segments are shown at 208-1, 208-2, and 208-3. At 210, the captions are now misaligned with the speech of the video because video segments 208 have been shifted due to the insertion of the ad slots. As shown, the 20 minute and 30 minute marks are now misaligned in the captions and the video after insertion of the ad slots. The caption file may be a continuous block of captions without any segmenting. However, when ad slots are inserted at 206, some of the captions become misaligned with the speech of the video.

Caption Processing

Figure 3:
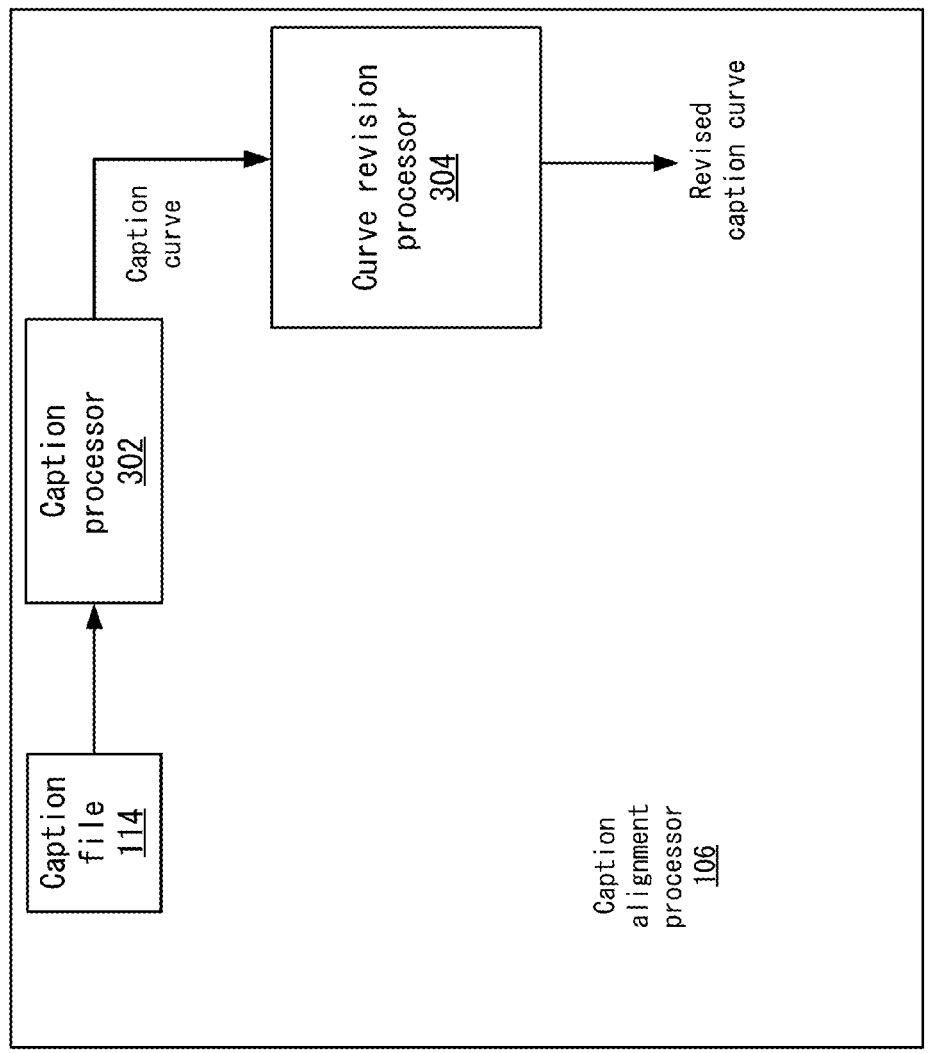
FIG. 3 depicts a more detailed example of caption alignment processor for caption processing according to one embodiment.

Caption alignment processor 106 may process the caption file to build a caption curve, such as a binary curve, that indicates when speech occurs or does not occur according to information in caption file 114. In one embodiment, caption alignment processor 106 does not use information from the audio of the video or any other information other than the words found in caption file 114. FIG. 3 depicts a more detailed example of caption alignment processor 106 for caption processing according to one embodiment. A caption curve processor 302 receives caption file 114. Caption curve processor 302 is configured to build the caption curve, which indicates when speech occurs or does not occur in caption file 114. In building the caption curve, when a caption is displayed in the video, then the caption curve will equal 1, or another value that indicates speech is occurring. Also, when caption file 114 indicates when a caption is not displayed in the video, then the caption curve will indicate 0, or another value that indicates speech is not occurring. To determine the times that captions are displayed, caption file 114 may include the captions and also time stamps that indicate when the captions start and stop. For example, caption file 114 may include character lines of characters that speak in the video. For each character line, caption file 114 includes a time stamp for when the line starts and ends. Ideally, the caption curve would indicate periods of speech and no speech. However, often captions are continuously displayed throughout the video even though speech may not be occurring. This is because the captions may be displayed before a character's line starts or may continue after the character has stopped speaking.

Figure 4A:
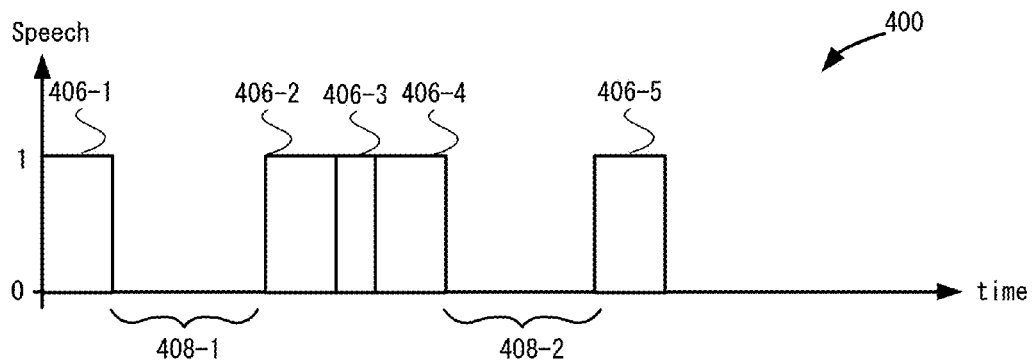
FIGS. 4A-4D show an example of caption curves according to one embodiment.

FIGS. 4A-4D show an example of caption curves according to one embodiment. In FIG. 4A, a graph 400 shows an ideal wave form for the caption curve according to one embodiment. The Y axis indicates speech or no speech and the X axis is time. A value of "1" indicates speech is occurring and a value of "0" indicates speech is not occurring, but other values may be used. As shown, different segments of captions 406-1-406-5 are provided. The captions correspond to character lines or speech within the video. For example, at 406-1, a first character line occurs. Then, at 408-1, no captions are displayed or a silence occurs. This may be where music is playing or the video includes other scenes where no one is speaking. At 406-2, 406-3, and 406-4, other character lines occur. Then at 408-2, another period of no captions or silence occurs. This process continues as another character speaks at 406-5. It should be noted that this is the ideal caption curve if the captions in caption file 114 exactly match the speech in the video. However, this may not occur due to characteristics of how the captions are displayed in the video.

Figure 4B:
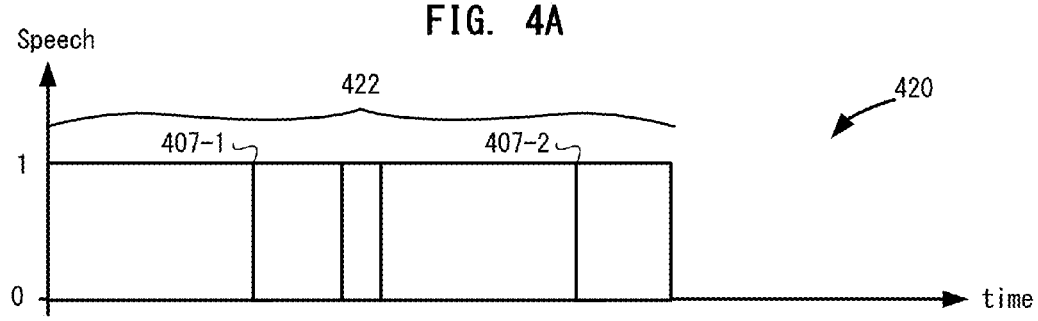

In FIG. 4B, a graph 420 shows an actual caption curve for the captions in caption file 114. This caption curve may be for a portion of the video. As can be seen at 422, the caption curve does not include any segments in which no captions are displayed. This is because the captions may be displayed even though speech is not occurring. This presents problems when generating the caption curve. For example, caption curve processor 302 may process captions in caption file 114 to generate a caption curve based on the captions. The caption curve may use the time stamps to determine the start and end points of character lines. This may be a curve shown in graph 420 of FIG. 4B, which does not include any breaks even though at some points, characters may not be speaking. Thus, when only analyzing information from caption file 114, the caption curve may not be accurate. Further, at 407-1 and 407-2, the start time or end time may be misaligned for a caption line. At 407-1, the start time is before the start time for the caption shown at 406-2. The same is true for 407-2 for the corresponding caption at 406-5. This may be a problem when caption file 114 is used to align the captions with the speech. Accordingly, caption alignment processor 106 may need to adjust the caption curve.

Referring back to FIG. 3, a curve revision processor 304 may then analyze the caption curve and revise the curve. For example, curve revision processor 304 may want to determine when captions are displayed that do not correspond to actual speech in the video. That is, no one is speaking when the caption is displayed (or there is no corresponding action or event in the show when the caption is describing an event). This analysis is performed without any use of the audio or other metadata outside caption file 114, and only with the words of the caption file. Other caption files may also be used as a training set to revise the caption curve.

Figure 5:
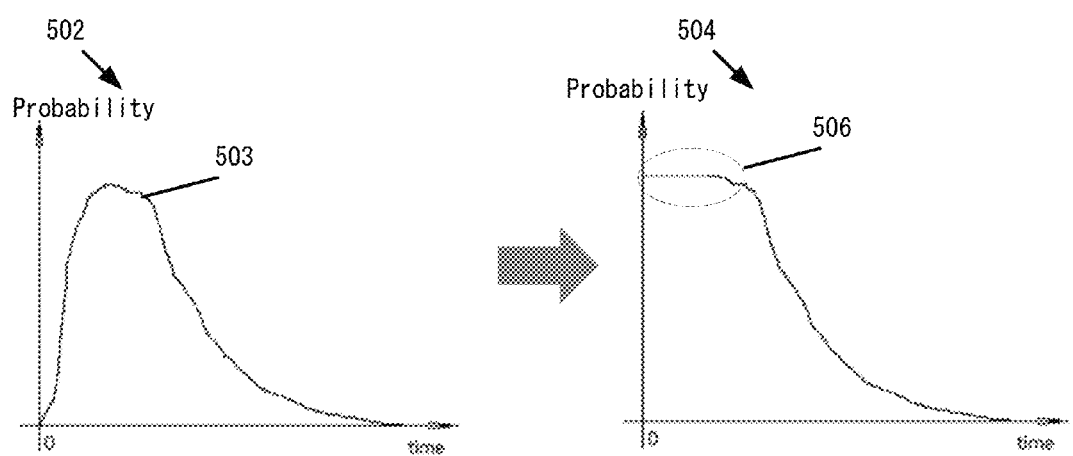
FIG. 5 shows distributions for the duration T of each character's line according to one embodiment.

In one embodiment, curve revision processor 304 builds a probability model. The probability model calculates a distribution of speech velocity, f, of characters per second. This may be how fast the speech occurs over multiple segments or character lines in the video. The probability model may be in the form of a histogram or distribution and can be used to estimate the duration, T, of each character's line. The probability model may be determined based on a training using one or more caption files. For example, caption files for multiple episodes of a show may be used. Also, only the caption file for the single show may be used to determine the speech velocity. For example, if there are C characters in a line within the start and end time stamp, curve revision processor 304 can estimate the time it takes for the character to speak that line. For example, the distribution of $T=Cf$ provides the time in which the character would speak the line in a distribution. For example, FIG. 5 shows distributions for the duration T of each character's line according to one embodiment. A graph 502 shows a probability/histogram curve of time for a caption line and a graph 504 shows a probability curve of speech along time. At graph 502, the Y axis shows the probability and the X axis shows the time during the segment. When a curve 503 increases, the probability of time increases. As shown by the distribution, the probability of time increases and then decreases after reaching its peak. At graph 504, curve revision processor 304 may revise the caption curve for the segment based on the distribution shown in graph 502. At the peak of the curve 503, the corresponding time is the most probable time for this line. So curve revision processor 304 can modify the curve 506 to generate the revised caption curve for this line. For example, at 506, curve revision processor 304 first uses a line segment through the peak to replace the increasing part of the curve 506 and then rescales the peak value to 1. Curve revision processor 304 obtains the probability curve 506 of speech along the time. The binary step is not a hard stop between the 1 and 0 values. The use of a soft step function may increase the likelihood that the caption curve will match the audio curve. This will be described in more detail below, but using the soft step function may match the characteristics of the audio curve better.

Figure 4C:
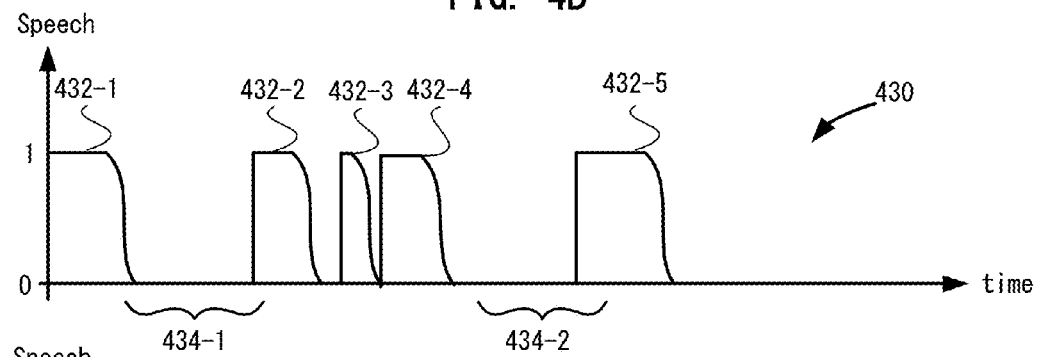

Referring to FIG. 4C, a graph 430 shows the adjustments to the caption curve according to one embodiment. As shown, at 432-1 to 432-5, segments of characters' lines have been provided. Also, periods at 434-1 and 434-2 indicate periods of no speech.

The probability model may be used to adjust the caption curve because if curve revision processor 304 can estimate the amount of time a character would take to speak a line based on the number of characters in the line, then times when no speech occur may be estimated. That is, if the character's line duration from the time stamps of caption file 114 is 30 seconds, but curve revision processor 304 estimates from the amount of characters in the line that the duration to speak the line should only be 20 seconds, curve revision processor 304 may adjust the caption curve to indicate the line ends after 20 seconds instead of 30 seconds.

In some cases, the above adjustment of the caption curve assumed that the caption was displayed at the end of the segment without corresponding speech in the video. As discussed above, the start times may also be wrong and at 432-2 and 432-5, the start times correspond to the points at 407-1 and 407-2 still. However, there may be instances where the caption is displayed at the beginning of a segment while there is no speech. This may occur because the content source may have wanted to display the caption before the character started speaking to give viewers a chance to start reading the caption. To revise the caption curve again, curve revision processor 304 detects when it is possible that the caption is displayed at the beginning of the segment without corresponding speech.

Figure 4D:
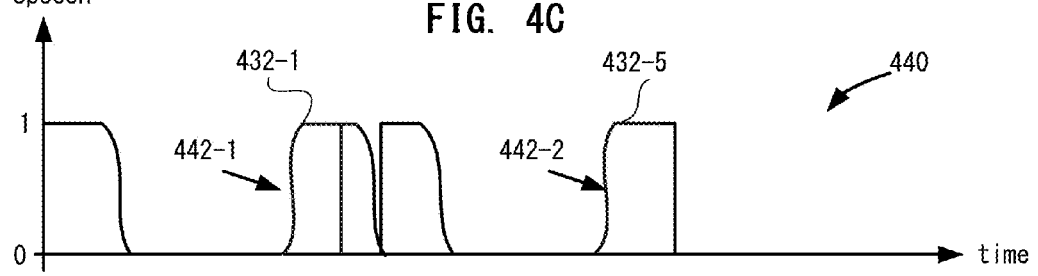

To determine whether the caption was displayed at the beginning or end of the segment without corresponding speech, curve revision processor 304 detects when the start time stamp from caption file 114 may not be accurate. In some cases, a long duration of no speech may indicate that the beginning time stamp is wrong. This may be because the first line of dialogue that may start after a silence may not always be accurate. Curve revision processor 304 may detect when there is a non-speech duration from graph 430 that is above a threshold, such as 5 seconds, and may revise the caption curve again. For example, the caption curve may be revised such that instead of having the end of the caption curve indicate no speech, the beginning of the segment may be revised to indicate no speech. In FIG. 4D, at 442-1 in a graph 440, segment 432-2 has been revised to indicate that the probability of speech is low at the beginning of the segment but higher at the end of the segment. Further, segment 432-5 is revised at 442-2 to indicate the probability of speech is low at the beginning of the segment but high at the end of the segment. These segments 432-1 and 432-5 now more correctly correspond to segments 406-2 and 406-5 in FIG. 4A.

Once the caption curve has been revised again, curve revision processor 304 outputs the final caption curve for caption file 114. The final caption curve indicates when the caption file indicates where speech occurs in the video.

Audio Processing

Figure 6:
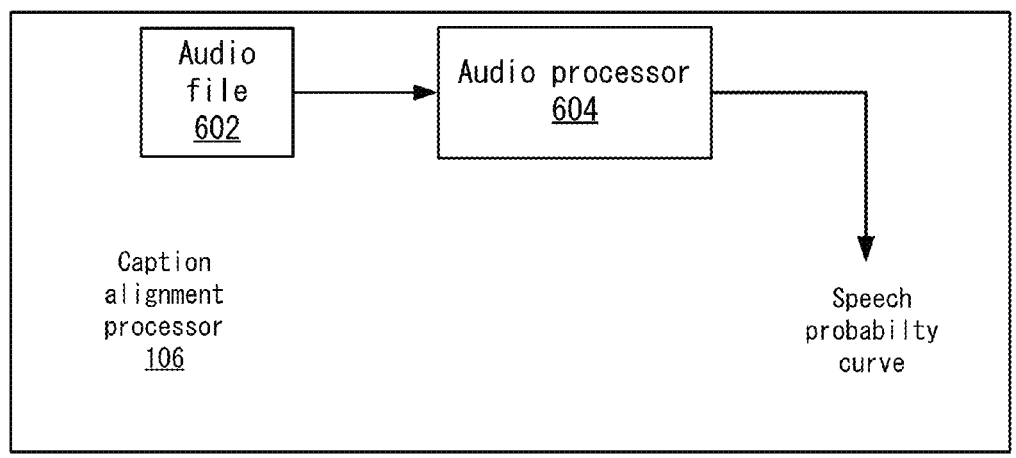
FIG. 6 shows an example of processing an audio file for the audio of the video according to one embodiment.
Figure 7:
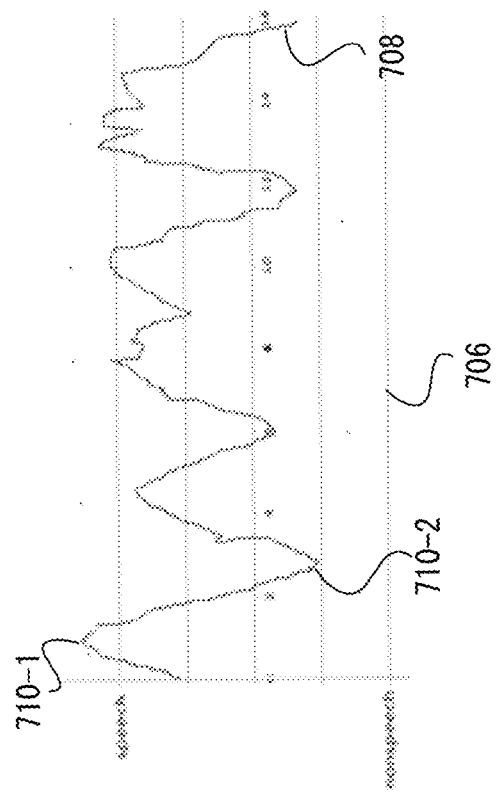
FIG. 7 shows an example of a speech probability curve according to one embodiment.
Figure 7:
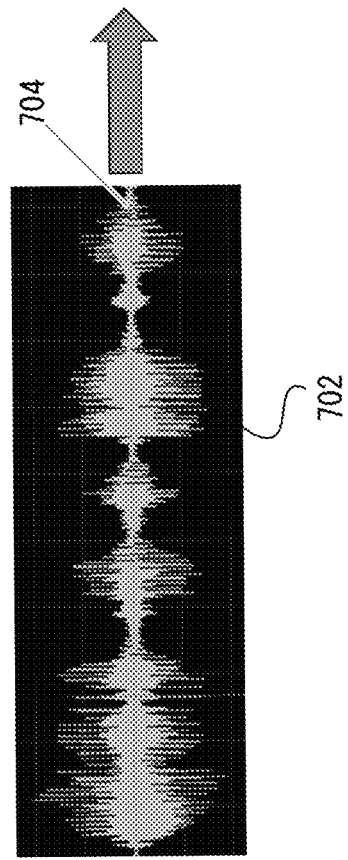

FIG. 6 shows an example of processing an audio file 602 for the audio of the video according to one embodiment. Audio file 602 may include the speech of the video, but may include other audio, such as background noise, music, etc. Basically, any sound found in the video may be included in audio file 602. Because audio file 602 may include information other than speech, an audio processor 604 may build a speech probability curve that indicates the probability of speech in the video. FIG. 7 shows an example of a speech probability curve according to one embodiment. At 702, a graph of the audio found in audio file 602 is shown. A signal 704 is an audio wave from audio file 602.

Audio processor 604 may generate an audio probability curve in a graph 706 from the audio in graph 702. The Y axis of graph 706 may indicate speech and non-speech values over time. A curve 708 may indicate the probability of speech or non-speech. As shown at 710-1, the probability of speech is high as compared to a point 710-2 where the probability of speech is low/the probability of non-speech is high. In one example, audio features may be extracted from an audio wave and analyzed to determine human speech from the features.

Correlation and Alignment

Figure 8:
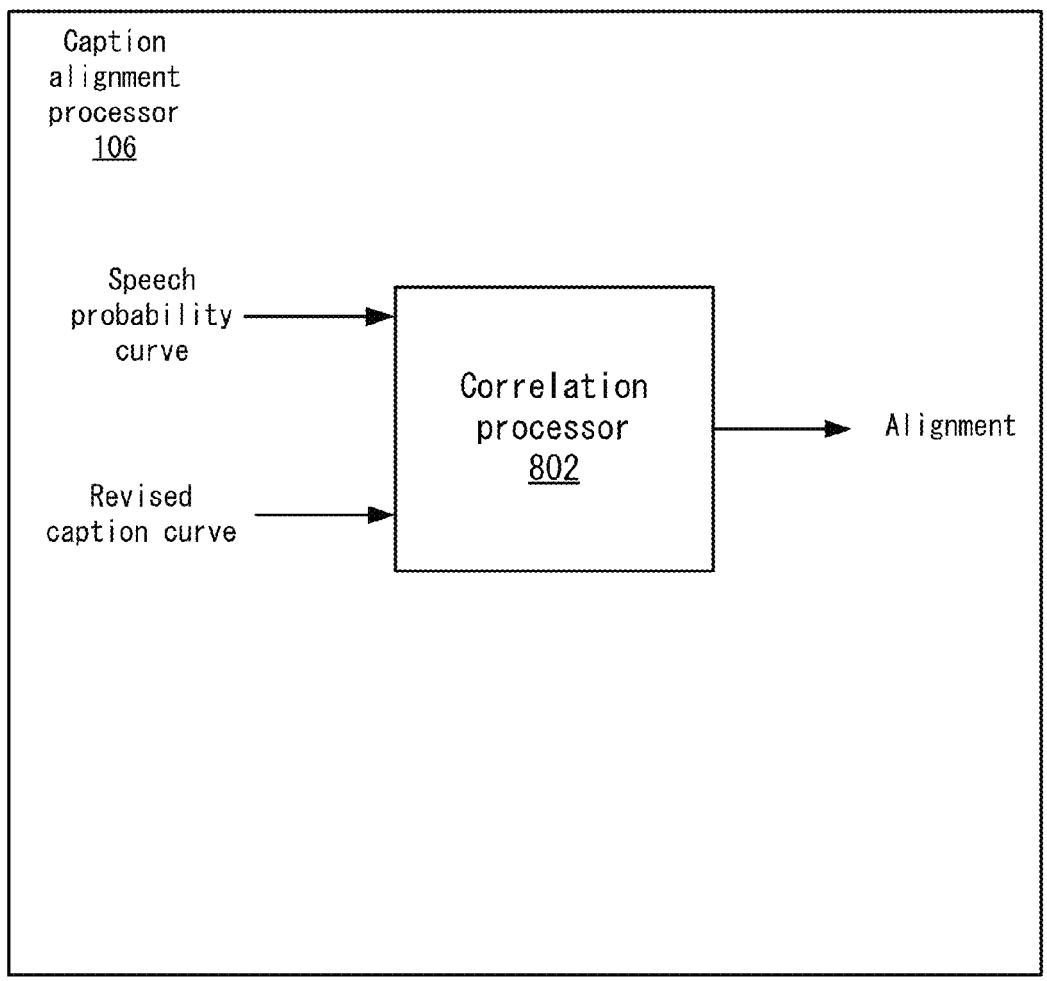
FIG. 8 depicts an example of the alignment according to one embodiment.

Once the speech probability curve and caption curve are generated, caption alignment processor 106 aligns the captions and speech. FIG. 8 depicts an example of the alignment according to one embodiment. Caption alignment processor 106 includes a correlation processor 802 that receives the speech probability curve and the revised caption curve. Correlation processor 802 may calculate correlation coefficients for segments in the speech probability curve. The correlation coefficients may be a measure of how well the speech probability curve is aligned with the caption curve at different offsets. Correlation processor 802 may use different methods to determine the correlation coefficients, which will be described in more detail below.

Figure 9:
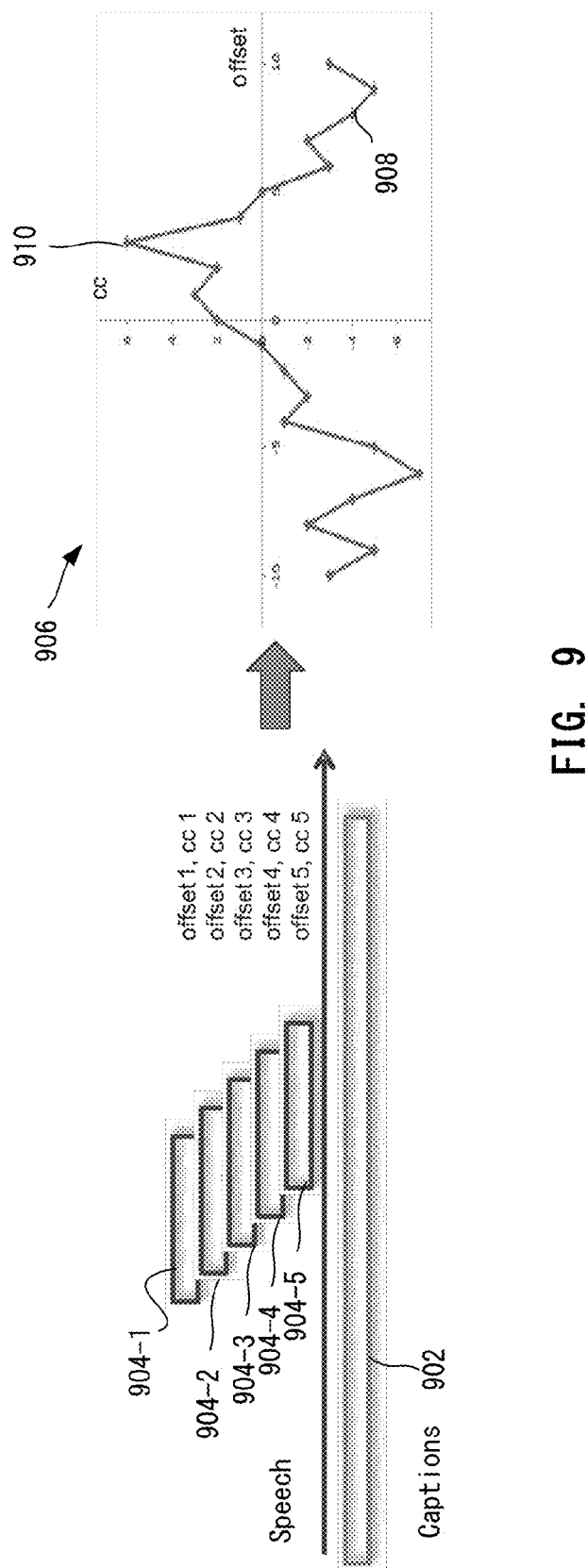
FIG. 9 shows one example of performing a correlation according to one embodiment.

FIG. 9 shows one example of performing a correlation according to one embodiment. At 902, the caption file is shown. Time stamps for the start and stop times of character lines are defined by caption file 114. Also, a segment of audio is shown from the audio file 602. Correlation processor 802 may shift the segment to different offsets shown at 904-1 to 904-5 to determine correlation coefficients for the shift. The correlation coefficients may be determined based on values of the speech probability curve and the caption curve. At a first offset 1, the correlation coefficient may be a value cc 1, which may be a value in which a higher number indicates more correlation between the audio segment and the caption and a lower number indicates less correlation between the audio segment and the caption. At 904-2, 904-3, 904-4, and 904-5, different offsets 2-5 result in correlation coefficients cc 2-cc 5, respectively. As the audio segment is moved to different offsets, the caption curve and speech probability curve align differently and different correlation coefficients result. For example, if the audio segment is moved to a position where the speech probability curve indicates a high probability of speech for the segment and the caption curve indicates speech is occurring, then the correlation coefficient may be high. Conversely, if the speech probability curve indicates there is a high probability of speech, but the caption curve indicates there is no speech, or vice versa, then the correlation coefficient may be low.

A graph 906 shows the correlation coefficients based on different offsets according to one embodiment. A line 908 maps the different correlation coefficient values based on the different offsets. At 910, a point shows the best offset to select based on the correlation coefficients. However, the maximum correlation coefficient may not always correspond to the optimal offset to the noise and periodicity. For example, if there are two audio segments that are very similar, they may have high cc values with the caption curve with the same offset. However, since the audio segments are different, they cannot have the same offset.

When generating the correlation coefficients, the revised caption curve is used. The revised caption curve better represents where the caption indicates speech occurs and thus leads to more accurate correlation coefficients. If the caption curve had not been revised, then the alignment would be less accurate. For example, the correlation coefficients may be higher at a time when a caption is being shown, but at this time, speech may not be occurring in the video. This would cause misalignment between the speech and captions.

Two approaches may reduce the risk of misalignment between the captions and the speech of the video. For example, the total of all correlation coefficients of all audio segments should achieve a maximum without overlap of any audio segments. That is, the audio segments should not overlap when the offsets are determined. Also, restraining the search range around a rough estimate of the true offset may eliminate false positives. For example, the range should be as small as possible, since near the true offset, the cc value has a sharp summit. If the range is very large, there may be other higher summits exist due to noise or periodicity.

Figure 10:
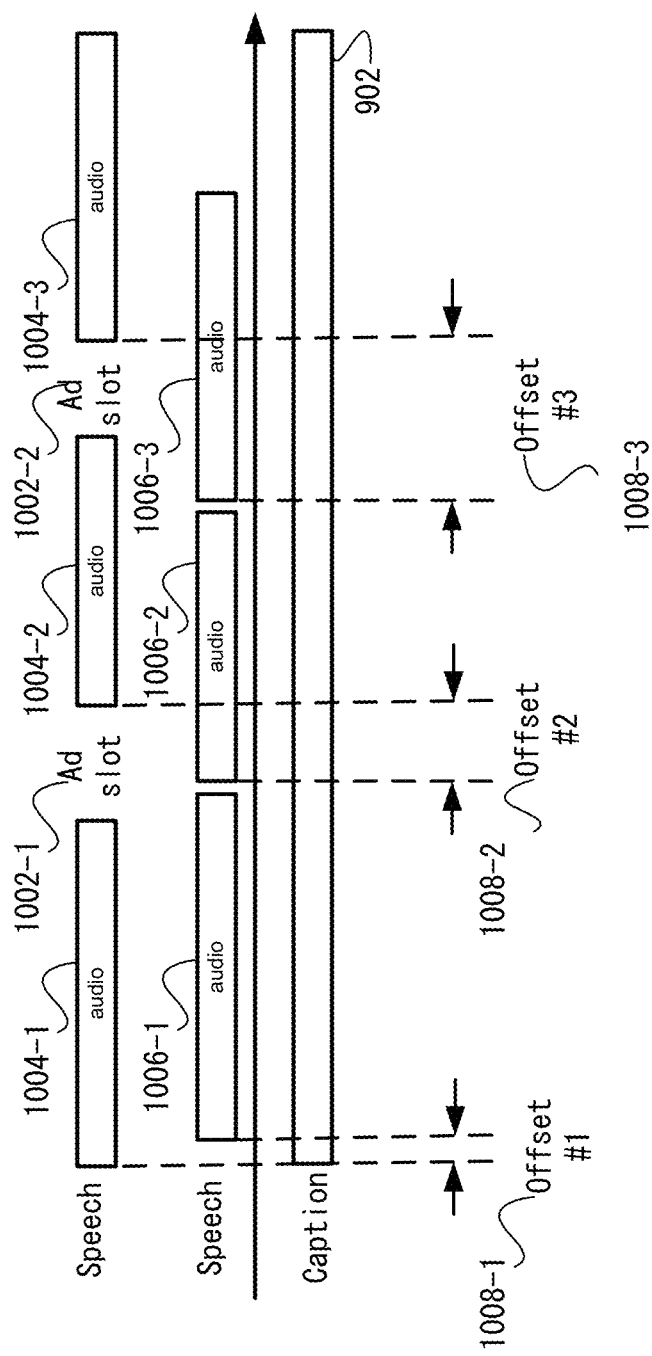
FIG. 10 shows an example of aligning multiple segments according to one embodiment.

FIG. 9 depicted the alignment using a single segment according to one embodiment. However, the alignment becomes much more difficult when aligning multiple segments in the video. FIG. 10 shows an example of aligning multiple segments according to one embodiment. Because ad slots have been inserted into the video at 1002-1 and 1002-2, ad slots have broken up the audio of the video to form audio segments at 1004-1, 1004-2, and 1004-3.

At 1006-1-1006-3, the theoretical optimal value for aligning audio segments with the caption file at 902 is shown. That is, the audio file does not include the ad slots that distort the timing of the audio segments in the video. As shown, an offset #1 at 1008-1, an offset #2 at 1008-2, and an offset #3 at 1008-3 exist between the audio segments with the ad slots inserted and the optimal position of the audio segments that are aligned with the captions. Particular embodiments need to determine the offsets to align the audio with the captions. Different methods may be used to align all of the audio segments in the video.

Figure 11:
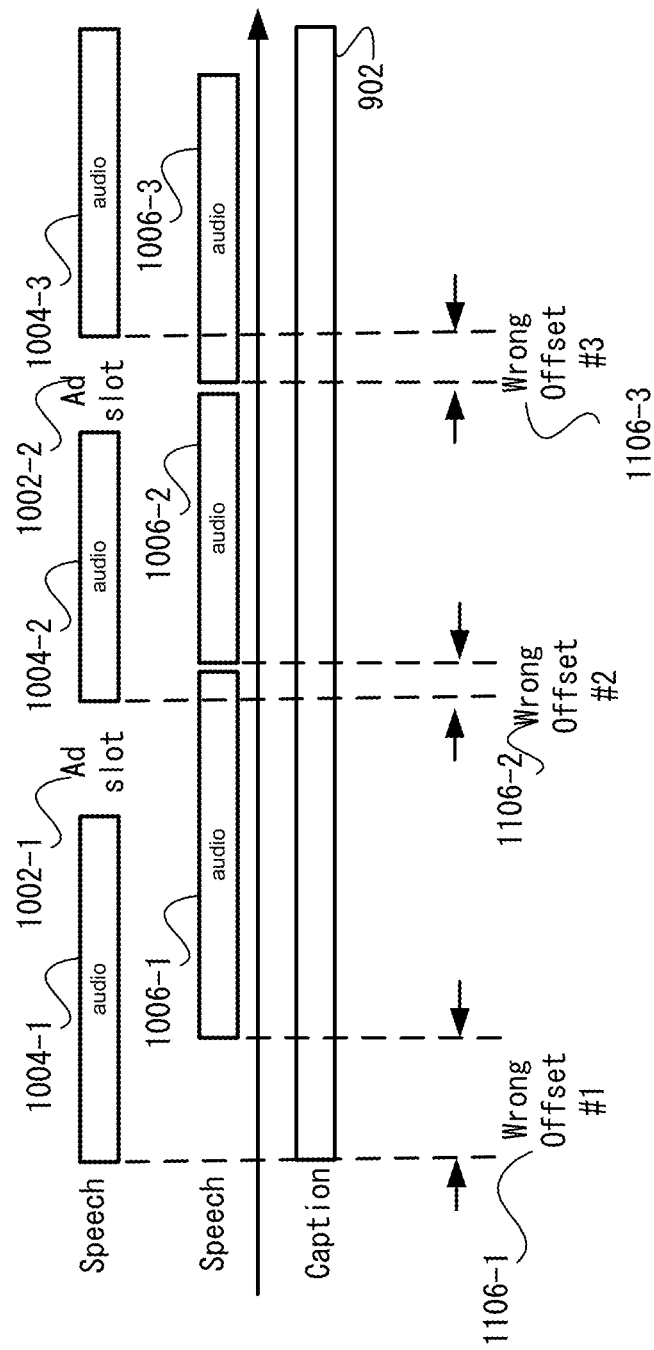
FIG. 11 depicts one example of an alignment scheme that can be used according to one embodiment.

FIG. 11 depicts one example of an alignment scheme that can be used according to one embodiment. In this scheme, correlation processor 802 may use a greedy method that calculates the best offset for a first segment, determines a search range for a second segment, and calculates the best offset for the second segment, and continues for all the segments in the audio. The risk is if a previous segment is misaligned, the search range of the subsequent segment will be wrong and then the alignment will not be as accurate or will fail. Once again, at 1004, audio segments are shown with ad slots 1002. Also, audio segments at 1006-1, 1006-2, and 1006-3 have been aligned with a caption curve at 902. Offsets 1106-1, 1106-2, and 1106-3, however, may be wrong. For example, if the audio segment at 1006-1 is not aligned correctly with the captions and a wrong offset #1 results, then this will result in a wrong offset #2 and a wrong offset #3. This is because the search range is set based on the first offset. If the first offset is wrong, and correlation processor 802 assumes the second audio segment should not overlap with the first audio segment, it may cause that the true offset for the second audio segment to not be in the search range of the second audio segment. Namely, if the true offset for the second audio segment is in the search range, the overlap will occur.

Figure 12:
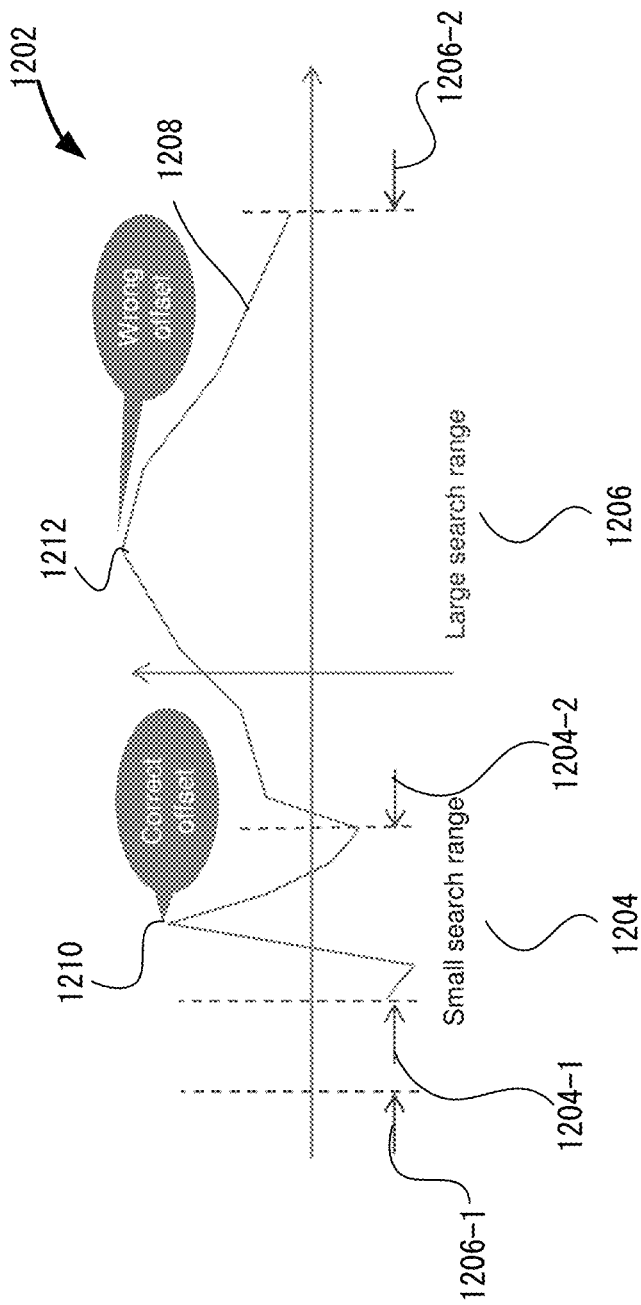
FIG. 12 depicts that the maximal correlation coefficient criterion is sometimes not reliable due to noise or periodical pattern.

In another embodiment, correlation processor 802 may use another scheme, such as dynamic programming instead of a greedy method. Dynamic programming may find a solution such that the total correlation coefficients of all segments achieve a maximum under the restraint that adjacent segments should not overlap. As mentioned above, the search range should be as small as possible to avoid wrong alignment. FIG. 12 depicts an example of wrong alignment caused by large search range according to one embodiment. To make the search range small, the start and end time stamp of an ad slot in the video can be calculated. This information provides a reasonably small search range that is better than a large range. The small search range may be used to determine the correct offset. A graph 1202 shows an example using the small search range and large search range. At 1204, the small search range is shown between 1204-1 and 1204-2 and a large search range is shown at 1206 between 1206-1 and 1206-2. The correlation coefficient for different offsets is shown in a line 1208.

In the small search range at 1204, the correct offset is shown at 1210 with the maximum correlation coefficient. Using a larger search range, a point at 1212 may have the maximum correlation coefficient. However, this may be the wrong offset as this offset is too far from the beginning point of the ad slot. The speech probability curve may have interference by background noise and music. If a search range during the alignment is too large, correlation processor 802 may use a wrong maximum correlation that leads to a wrong offset. Because ad slot location is known, the ad slot duration can be easily detected by an audio signal and that can be used to shorten the search range.

Figure 13:
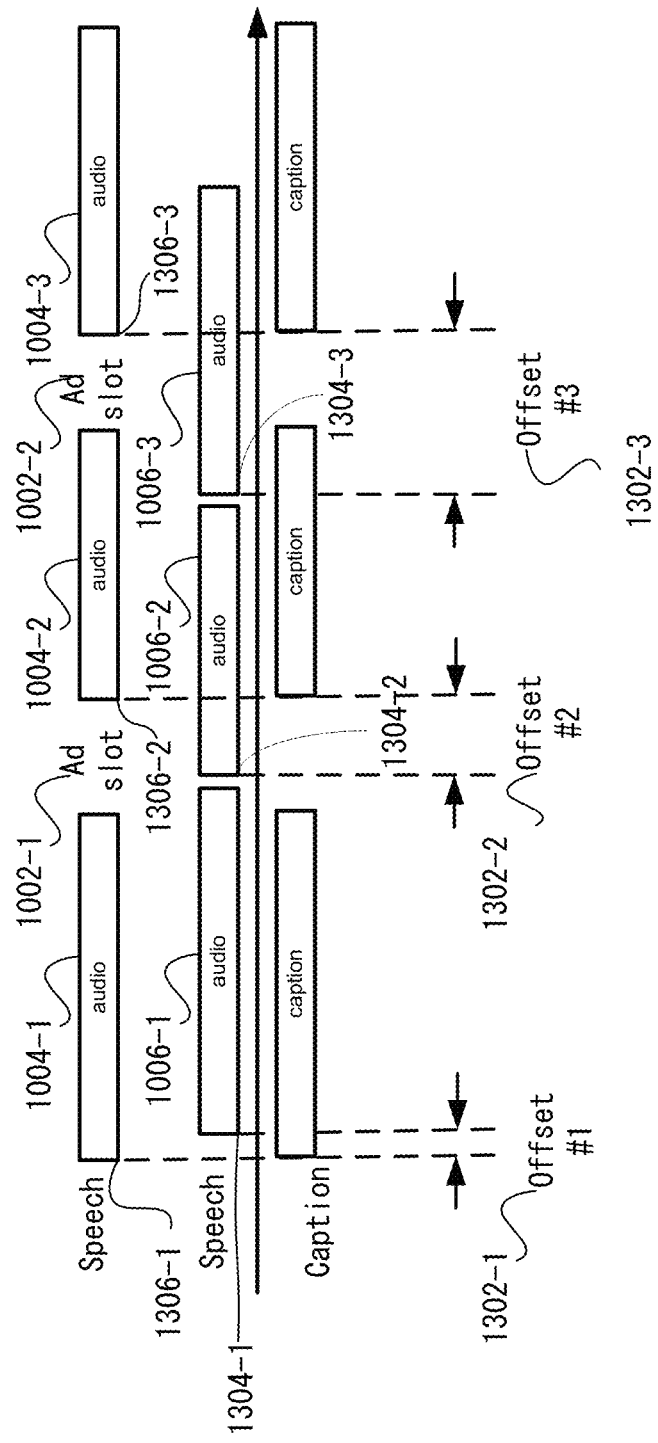
FIG. 13 depicts an example of a correct alignment according to one embodiment.

FIG. 13 depicts an example of a correct alignment according to one embodiment. As shown, offsets 1, 2, and 3 are shown at 1302-1, 1302-2, and 1302-3, respectively. These offsets are used to align the captions with the audio segments in the video that include ad pods. For example, a caption starting at a time shown at 1304-1 in caption file 114 is adjusted to start at a time 1306-1. This moves the caption to align with when the audio actually starts speaking. Also, for offset #2, the caption start time is adjusted by the offset #2 from 1304-2 to 1306-2. Similarly, the offset #3 is adjusted from 1304-3 to 1306-3. This adjusts the start times for the captions based on the offsets.

Accordingly, particular embodiments may use a caption file and audio file to align captions with the speech of a video. The caption file is revised such that the captions correspond directly with the speech of the video such that the alignment can be performed correctly. If the caption curve is not revised, then generating an accurate alignment would be harder. By revising the caption curve, the alignment to the speech probability curve is more accurate and the reading of the correlation coefficients is more likely to yield an accurate alignment. Thus, the revision of the caption curve improves the performance of correlation processor 802. That is, the correlation can be performed faster due to using less computing resources to perform the correlation because the correlation is more accurate. That is, the caption curve and the speech probability curve may be more similar allowing the alignment to be performed faster. Further, using a smaller search range may also speed up the alignment process.

System Overview

Figure 14:
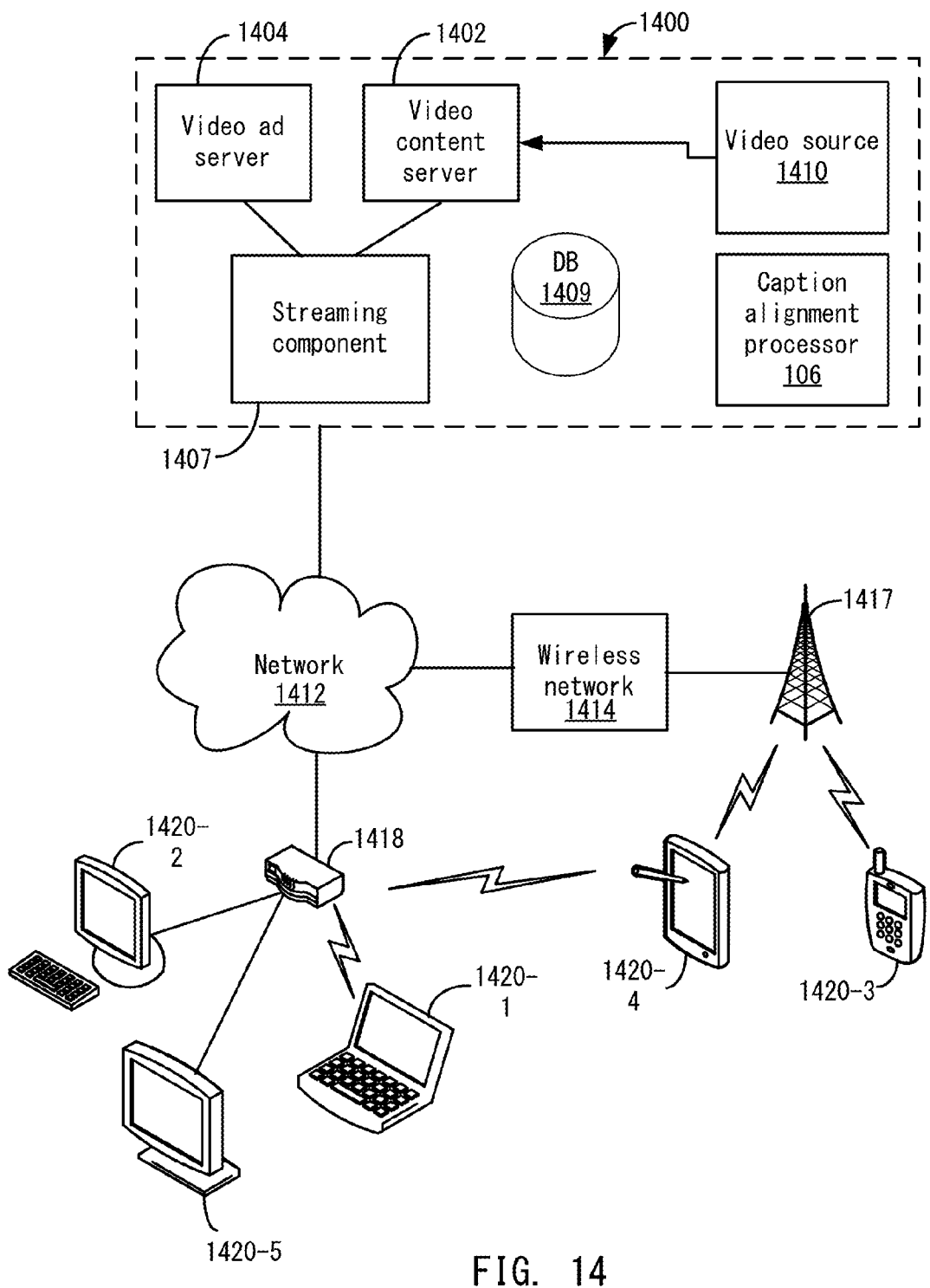
FIG. 14 depicts a video streaming system in communication with multiple client devices via one or more communication networks according to one embodiment.

Features and aspects as disclosed herein may be implemented in conjunction with a video streaming system 1400 in communication with multiple client devices via one or more communication networks as shown in FIG. 14. Aspects of the video streaming system 1400 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1400, video data may be obtained from one or more sources for example, from a video source 1410, for use as input to a video content server 1402. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1400 may include one or more computer servers or modules 1402, 1404, and/or 1407 distributed over one or more computers. Each server 1402, 1404, 1407 may include, or may be operatively coupled to, one or more data stores 1409, for example databases, indexes, files, or other data structures. A video content server 1402 may access a data store (not shown) of various video segments. The video content server 1402 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1404 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1400, a public service message, or some other information. The video advertising server 1404 may serve the video advertising segments as directed by a user interface controller (not shown).

The video streaming system 1400 also may include caption alignment processor 106.

The video streaming system 1400 may further include an integration and streaming component 1407 that integrates video content and video advertising into a streaming video segment. For example, streaming component 1407 may be a content server or streaming media server. A controller (not shown) may determine the selection or configuration of advertising in the streaming video based on any suitable algorithm or process. The video streaming system 1400 may include other modules or units not depicted in FIG. 14, for example administrative servers, commerce servers, network infrastructure, advertising selection engines, and so forth.

The video streaming system 1400 may connect to a data communication network 1412. A data communication network 1412 may comprise a local area network (LAN), a wide area network (WAN), for example, the Internet, a telephone network, a wireless cellular telecommunications network (WCS) 1414, or some combination of these or similar networks.

One or more client devices 1420 may be in communication with the video streaming system 1400, via the data communication network 1412 and/or other network 1414. Such client devices may include, for example, one or more laptop computers 1420-1, desktop computers 1420-2, "smart" mobile phones 1420-3, tablet devices 1420-4, network-enabled televisions 1420-5, or combinations thereof, via a router 1418 for a LAN, via a base station 1417 for a wireless telephony network 1414, or via some other connection. In operation, such client devices 1420 may send and receive data or instructions to the system 1400, in response to user input received from user input devices or other input. In response, the system 1400 may serve video segments and metadata from the data store 1409 responsive to selection of media programs to the client devices 1420. Client devices 1420 may output the video content from the streaming video segment in a media player using a display screen, projector, or other video output device, and receive user input for interacting with the video content.

Distribution of audio-video data may be implemented from streaming component 1407 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1407 may communicate with client device 1420 using control messages and data messages to adjust to changing network conditions as the video is played. These control messages can include commands for enabling control functions such as fast forward, fast reverse, pausing, or seeking to a particular part of the file at the client.

Since streaming component 1407 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1407 may use TCP-based protocols, such as HTTP and Real Time Messaging Protocol (RTMP). Streaming component 1407 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS). The HLS protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 15:
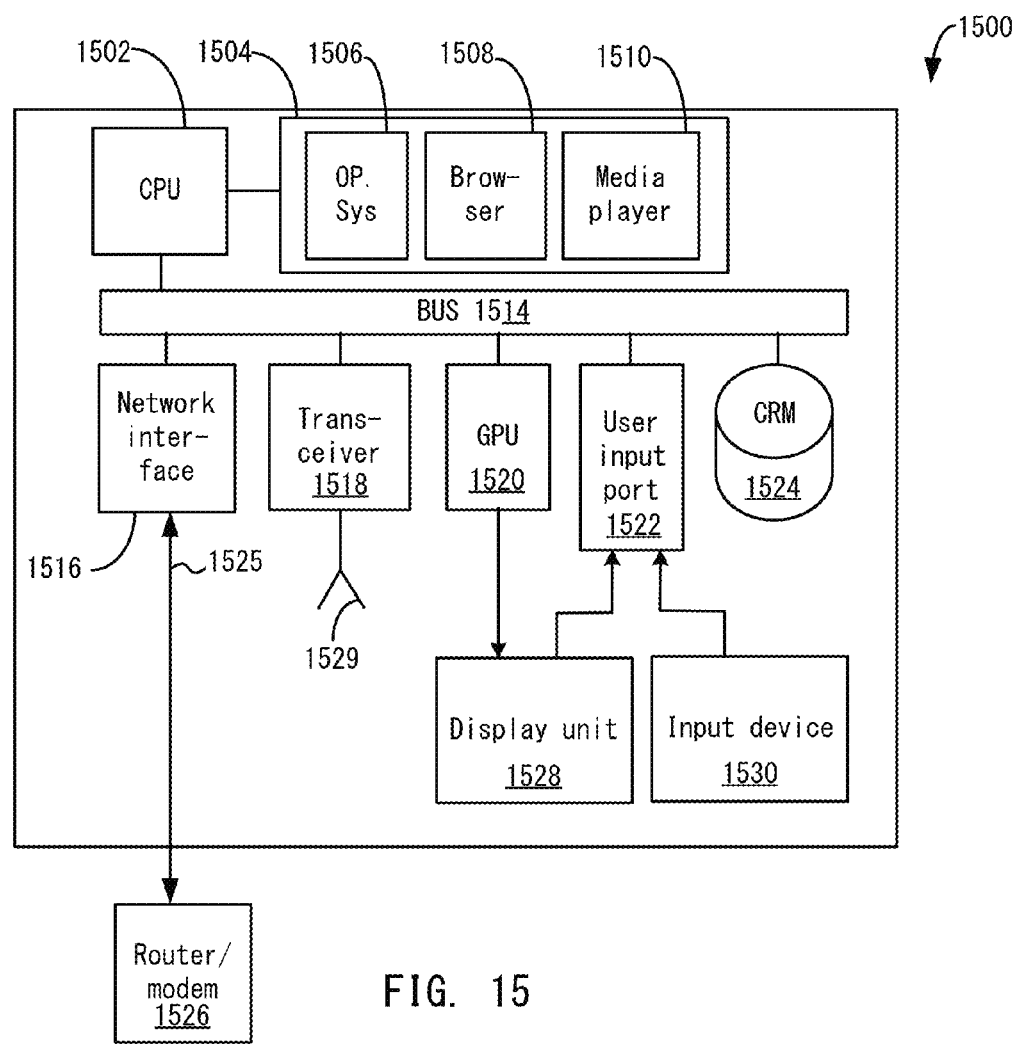
FIG. 15 depicts a diagrammatic view of an apparatus for viewing video content and advertisements.

Referring to FIG. 15, a diagrammatic view of an apparatus 1500 for viewing video content and advertisements is illustrated. In selected embodiments, the apparatus 1500 may include a processor (CPU) 1502 operatively coupled to a processor memory 1504, which holds binary-coded functional modules for execution by the processor 1502. Such functional modules may include an operating system 1506 for handling system functions such as input/output and memory access, a browser 1508 to display web pages, and media player 1510 for playing video. The media player displays the aligned captions and speech. The memory 1504 may hold additional modules not shown in FIG. 15, for example modules for performing other operations described elsewhere herein.

A bus 1514 or other communication component may support communication of information within the apparatus 1500. The processor 1502 may be a specialized or dedicated microprocessor configured to perform particular tasks in accordance with the features and aspects disclosed herein by executing machine-readable software code defining the particular tasks. Processor memory 1504 (e.g., random access memory (RAM) or other dynamic storage device) may be connected to the bus 1514 or directly to the processor 1502, and store information and instructions to be executed by a processor 1502. The memory 1504 may also store temporary variables or other intermediate information during execution of such instructions.

A computer-readable medium in a storage device 1524 may be connected to the bus 1514 and store static information and instructions for the processor 1502; for example, the storage device (CRM) 1524 may store the modules 1506, 1508, 1510 and 1512 when the apparatus 1500 is powered off, from which the modules may be loaded into the processor memory 1504 when the apparatus 1500 is powered up. The storage device 1524 may include a non-transitory computer-readable storage medium holding information, instructions, or some combination thereof, for example instructions that when executed by the processor 1502, cause the apparatus 1500 to be configured to perform one or more operations of a method as described herein.

A communication interface 1516 may also be connected to the bus 1514. The communication interface 1516 may provide or support two-way data communication between the apparatus 1500 and one or more external devices, e.g., the streaming system 1400, optionally via a router/modem 1526 and a wired or wireless connection. In the alternative, or in addition, the apparatus 1500 may include a transceiver 1518 connected to an antenna 1529, through which the apparatus 1500 may communicate wirelessly with a base station for a wireless communication system or with the router/modem 1526. In the alternative, the apparatus 1500 may communicate with a video streaming system 1400 via a local area network, virtual private network, or other network. In another alternative, the apparatus 1500 may be incorporated as a module or component of the system 1400 and communicate with other components via the bus 1514 or by some other modality.

The apparatus 1500 may be connected (e.g., via the bus 1514 and graphics processing unit 1520) to a display unit 1528. A display 1528 may include any suitable configuration for displaying information to an operator of the apparatus 1500. For example, a display 1528 may include or utilize a liquid crystal display (LCD), touchscreen LCD (e.g., capacitive display), light emitting diode (LED) display, projector, or other display device to present information to a user of the apparatus 1500 in a visual display.

One or more input devices 1530 (e.g., an alphanumeric keyboard, microphone, keypad, remote controller, game controller, camera or camera array) may be connected to the bus 1514 via a user input port 1522 to communicate information and commands to the apparatus 1500. In selected embodiments, an input device 1530 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1528, for example using a touch sensitive screen. A cursor control device may communicate direction information and command selections to the processor 1502 and control cursor movement on the display 1528. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a video including ad slots inserted within the video;
   generating, by the computing device, a caption curve for a caption file of captions for the video based on start times and stop times for caption segments in the caption file, wherein the caption segments in the caption file were generated for the video without including ad slots;
   determining, by the computing device, a speech velocity of characters per a time unit using a set of caption files that include captions for a set of videos, wherein the speech velocity is used to estimate how fast speech occurs for caption segments in the set of videos;
   detecting, by the computing device, when the start time or the stop time of one or more caption segments should be adjusted based on the speech velocity, a number of characters in caption segments in the caption file, and a duration between the start time and the stop time;
   revising, by the computing device, the start time or the stop time for the one or more caption segments associated with the caption curve based on the detecting;
   determining, by the computing device, a speech probability curve based on audio of the video, wherein the speech probability curve indicates a probability of speech occurring in the video; and
   correlating, by the computing device, the speech probability curve to the revised caption curve to align the caption segments of the caption file with speech of the video.

2. The method of claim 1, wherein
   the caption curve indicates a first value when a caption segment is displayed and a second value when the caption segment is not displayed.

3. The method of claim 1, wherein revising the caption curve comprises:
   changing a portion of the caption curve from a first value indicating the caption segment is displayed to a second value indication the caption segment is not displayed.

4. The method of claim 3, wherein the change of the portion is at an end of the caption segment.

5. The method of claim 4, further comprising:
   changing the portion of the caption curve at the end of the caption segment that is the second value to the first value; and
   changing a portion of the caption curve at a beginning of the caption segment from the first value to the second value.

6. The method of claim 5, further comprising:
   determining a period of time in which the caption curve includes the second value for a time over a threshold to determine when to change the portion at the end of the caption segment and the portion at the beginning of the caption segment.

7. The method of claim 1, wherein determining the speech velocity comprises:
   building a probability model to calculate a distribution of the speech velocity.

8. The method of claim 1, wherein revising the caption curve comprises:
   estimating a time duration of each caption segment based on the number of characters in the caption segment and the speech velocity; and
   revising the caption curve for the caption segment based on the time duration.

9. The method of claim 1, wherein correlating the speech probability curve to the revised caption curve comprises:
   determining different offsets for a caption segment;
   determining different correlation coefficients for the different offsets; and
   selecting one of the offsets based on the different correlation coefficients.

10. The method of claim 9, wherein selecting one of the offsets based on the different correlation coefficients comprises:
    selecting a correlation coefficient that is a maximum within a search range.

11. The method of claim 1, wherein correlating the speech probability curve to the revised caption curve comprises:
    determining a first offset for a first caption segment;
    determining a search range for a second caption segment;
    calculating a second offset for the second caption segment based on the search range; and
    continuing to calculate offsets for other caption segments.

12. The method of claim 1, wherein correlating the speech probability curve to the revised caption curve comprises:
    determining start and stop times for the ad slots;
    determining a search range for a caption segment based on the start and stop times for the ad slots; and
    calculating an offset for the caption segment based on the search range.

13. A non-transitory computer-readable storage medium containing instructions, that when executed, control a computer system to be configured for:
  determining a video including ad slots inserted within the video;
  generating a caption curve for a caption file of captions for the video based on start times and stop times for caption segments in the caption file, wherein the caption segments in the caption file were generated for the video without including ad slots;
  determining a speech velocity of characters per a time unit using a set of caption files that include captions for a set of videos, wherein the speech velocity is used to estimate how fast speech occurs for caption segments in the set of videos;
  detecting when the start time or the stop time of one or more caption segments should be adjusted based on the speech velocity, a number of characters in caption segments in the caption file, and a duration between the start time and the stop time;
  revising the start time or the stop time for the one or more caption segments associated with the caption curve based on the detecting;
  determining a speech probability curve based on audio of the video, wherein the speech probability curve indicates a probability of speech occurring in the video; and
  correlating the speech probability curve to the revised caption curve to align the caption segments of the caption file with speech of the video.

14. The non-transitory computer-readable storage medium of claim 13, wherein
  the caption curve indicates a first value when a caption segment is displayed and a second value when the caption segment is not displayed.

15. The non-transitory computer-readable storage medium of claim 13, wherein revising the caption curve comprises:
  changing a portion of the caption curve from a first value indicating the caption segment is displayed to a second value indication the caption segment is not displayed.

16. The non-transitory computer-readable storage medium of claim 13, wherein determining the speech velocity comprises:
  building a probability model to calculate a distribution of the speech velocity.

17. The non-transitory computer-readable storage medium of claim 13, wherein revising the caption curve comprises:
  estimating a time duration of each caption segment based on the number of characters in the caption segment and the speech velcoity; and
  revising the caption curve for the caption segment based on the time duration.

18. The non-transitory computer-readable storage medium of claim 13, wherein correlating the speech probability curve to the revised caption curve comprises:
  determining start and stop times for the ad slots;
  determining a search range for a caption segment based on the start and stop times for the ad slots; and
  calculating an offset for the caption segment based on the search range.

19. An apparatus comprising:
  one or more computer processors; and
  a non-transitory computer-readable storage medium comprising instructions, that when executed, control the one or more computer processors to be configured for:
  determining a video including ad slots inserted within the video;
  generating a caption curve for a caption file of captions for the video based on start times and stop times for caption segments in the caption file, wherein the caption segments in the caption file were generated for the video without including ad slots;
  determining a speech velocity of characters per a time unit using a set of caption files that include captions for a set of videos, wherein the speech velocity is used to estimate how fast speech occurs for caption segments in the set of videos;
  detecting when the start time or the stop time of one or more caption segments should be adjusted based on the speech velocity, a number of characters in caption segments in the caption file, and a duration between the start time and the stop time;
  revising the start time or the stop time for the one or more caption segments associated with the caption curve based on the detecting;
  determining a speech probability curve based on audio of the video, wherein the speech probability curve indicates a probability of speech occurring in the video; and
  correlating the speech probability curve to the revised caption curve to align the caption segments of the caption file with speech of the video.

* * * * *